(12) United States Patent
Edinger (10) Patent No.: US 12,083,598 B2
(45) Date of Patent: Sep. 10, 2024

(54) APPARATUS AND METHOD FOR DISPENSING POWDERED MATERIAL

(71) Applicant: Ralf Edinger, Richmond (CA)

(72) Inventor: Ralf Edinger, Richmond (CA)

(73) Assignee: Ralf Edinger, Richmond (CA)

( * ) Notice: Subject to any disclaimer, the term of this patent is extended or adjusted under 35 U.S.C. 154(b) by 810 days.

(21) Appl. No.: 17/261,009

(22) PCT Filed: Aug. 5, 2019

(86) PCT No.: PCT/CA2019/051074
§ 371 (c)(1),
(2) Date: Jan. 16, 2021

(87) PCT Pub. No.: WO2020/028979
PCT Pub. Date: Feb. 13, 2020

(65) Prior Publication Data
US 2021/0260666 A1  Aug. 26, 2021

Related U.S. Application Data

(60) Provisional application No. 62/715,139, filed on Aug. 6, 2018.

(51) Int. Cl.
*B22F 12/57* (2021.01)
*B22F 10/28* (2021.01)
(Continued)

(52) U.S. Cl.
CPC .............. *B22F 12/57* (2021.01); *B22F 10/85* (2021.01); *B22F 12/13* (2021.01); *B22F 12/43* (2021.01);
(Continued)

(58) Field of Classification Search
CPC ........ B22F 10/28; B22F 10/30; B22F 10/368; B22F 10/85; B22F 12/13; B22F 12/41;
(Continued)

(56) References Cited

U.S. PATENT DOCUMENTS 9,486,962 B1   11/2016   Dugan et al.
9,604,410 B2    3/2017   Okazaki et al.
(Continued)

FOREIGN PATENT DOCUMENTS

DE   10 2015 016464 A1    6/2017
DE   10 2016 209094 A1   11/2017
(Continued)

OTHER PUBLICATIONS

International Search Report in International Application No. PCT/CA2019/051074 issued Oct. 10, 2019.
(Continued)

*Primary Examiner* — Philip C Tucker
*Assistant Examiner* — Jimmy R Smith, Jr.

(57) ABSTRACT

Examples of an apparatus for dispensing a powdered material are described. The dispensing apparatus comprises a dispenser with an inlet and a dispensing opening, and a vibrating system that is in communication to the dispenser and which provides a continuing periodic oscillation of the dispenser. The apparatus further comprises a controller in communication with a driver of the vibrating system to control a frequency, amplitude and duration of the vibrations such that the powdered material continuously flows out through the dispensing opening during vibration of the dispenser.

20 Claims, 12 Drawing Sheets

(51) Int. Cl.
  *B22F 10/368* (2021.01)
  *B22F 10/85* (2021.01)
  *B22F 12/13* (2021.01)
  *B22F 12/41* (2021.01)
  *B22F 12/43* (2021.01)
  *B22F 12/50* (2021.01)
  *B22F 12/58* (2021.01)
  *B22F 12/90* (2021.01)
  *B29C 64/343* (2017.01)
  *B29C 64/393* (2017.01)
  *B33Y 30/00* (2015.01)
  *B33Y 40/10* (2020.01)
  *B33Y 50/02* (2015.01)

(52) U.S. Cl.
  CPC .............. *B22F 12/50* (2021.01); *B22F 12/58* (2021.01); *B29C 64/343* (2017.08); *B29C 64/393* (2017.08); *B33Y 30/00* (2014.12); *B33Y 40/10* (2020.01); *B33Y 50/02* (2014.12); *B22F 10/28* (2021.01); *B22F 10/368* (2021.01); *B22F 12/41* (2021.01); *B22F 12/90* (2021.01)

(58) Field of Classification Search
  CPC .......... B22F 12/43; B22F 12/50; B22F 12/57; B22F 12/58; B22F 12/90; B22F 2202/01; B22F 2202/05; B22F 2202/06; B22F 2999/00; B29C 64/153; B29C 64/205; B29C 64/236; B29C 64/268; B29C 64/329; B29C 64/336; B29C 64/321; B29C 64/343; B29C 64/209; B29C 64/214; B29C 64/141; B29C 64/393; B33Y 10/00; B33Y 30/00; B33Y 40/00; B33Y 40/10; B33Y 50/02; Y02P 10/25
  See application file for complete search history.

(56) References Cited

U.S. PATENT DOCUMENTS

| | | | |
|---|---|---|---|
| 11,691,334 B2* | 7/2023 | Voss | ........................ B07B 1/40 264/460 |
| 2006/0105102 A1 | 5/2006 | Hochsmann | |
| 2017/0341302 A1 | 11/2017 | Höchsmann et al. | |
| 2018/0369910 A1 | 12/2018 | Günther et al. | |

FOREIGN PATENT DOCUMENTS

| | | |
|---|---|---|
| WO | 2017215870 A1 | 12/2017 |
| WO | 2018022046 A1 | 2/2018 |
| WO | 2018067336 A1 | 4/2018 |
| WO | 2018162261 A1 | 9/2018 |

OTHER PUBLICATIONS

Written opinion on Patentability of International Application No. PCT/CA2019/051074 issued Oct. 10, 2019.
Supplementary European Search Report issued Mar. 7, 2022.
Written opinion from EPO issued Mar. 7, 2022.

* cited by examiner

APPARATUS AND METHOD FOR DISPENSING POWDERED MATERIAL

TECHNICAL FIELD

The present disclosure relates to an apparatus and a method for dispensing powdered material and more particularly to sufficiently fluidizing the powdered material to maintain consistent flow properties of the powder.

BACKGROUND

Fluidization is a widely used process in various industries to achieve continuous powder flowability in controllable manner. Most common way for powder fluidization is gas fluidization, where solid powder particles are transformed into a fluid-like state through suspension in a gas. Gas fluidization of small solid particles has been widely used in a variety of industrial applications because of its capability of continuous powder handling and good mixing. However, in some applications, such as for example any technology or processes that are implemented under vacuum, gas fluidization may not be done. For example, additive manufacturing technology, such as an electron-beam melting (EBM) technology, takes place under vacuum, in which products are manufactured by melting metal powder, layer by layer, with an electron beam as a heat source. The EBM process usually consists of three major steps: 1) preheating a powder bed workpiece to higher temperature depending on the material/metal 2) depositing and spreading a thin layer (in microns) of the metal powder on the powder bed, and 3) melting the powder using a computer-controlled electron beam. The process takes place under vacuum, which makes it suited to manufacture parts in reactive materials with a high affinity for oxygen, e.g. titanium.

The metal powder particles are usually dispensed from a storing container under the action of gravity. However, flow characteristics of the powders in general have a tendency to prevent flow of the powder through small holes due to the fact that the powder particles tend to agglomerate into larger particles. This may disrupt the flowability of the powder and stable supplying rate and accuracy of the amount of the provided powder.

SUMMARY

In one aspect, an apparatus for dispensing a powdered material is provided. The dispensing apparatus comprises a dispenser that has a housing that defines an inner cavity of the dispenser with an inlet and a dispensing opening. The apparatus further comprises a vibrating system that has a driver in communication to the dispenser and which provides continuing periodic vibrations to the dispenser. The apparatus further comprises a controller in communication with the driver of the vibrating system to control a frequency, an amplitude and a duration of the vibrations such that the powdered material continuously flows out through the dispensing opening during vibration of the dispenser.

In one aspect, a displacement sensor configured to measure mechanical displacement of the dispenser is provided. The displacement sensor provides an input signal to the controller about the measure displacement of the dispenser and the controller adjusts a frequency and/or an amplitude of the driver of the vibrating system in real-time based on the input signal from the displacement sensor.

In one aspect, the dispensing opening is configured as a dispensing slot comprising an elongated opened channel such that a fluidized curtain of powder flows along a length of the channel and out through the dispensing slot.

In another aspect, the apparatus comprises a movable shutter configured to close a portion of the dispensing slot when in first position to provide an interrupted fluidized layer of powdered material.

In yet another aspect, the dispensing apparatus comprises at least two storage containers to store different powders and a mixing chamber positioned between the storage containers and the dispenser. The mixing chamber has at least two inlets and an outlet. One of the inlets is in fluid communication with one of the storage containers and the other inlet is in fluid communication with the other storage container. The powdered materials from the storage containers are injected into the mixing chamber through the respective inlets and are mixed into a mixed powdered material. The mixing chamber comprises an outlet that is in fluid communication with the inlet of the dispenser to feed the mixed powdered materials into the dispenser.

In one aspect, an additive manufacturing system is provided. The system comprises an energy source, a working chamber coupled to the energy source, a work platform positioned in the vacuum chamber, a powder bed positioned on the work platform and the apparatus for dispensing the powdered material to dispense the powdered material onto the powdered bed. The energy source generates an energy beam that is focused using a focusing means onto a small region of the powder bed producing small volumes of melt pools.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIG. 5 is a graph schematically illustrating flowing rate of a metal powder in grams per second where: a dash-dot line represents flowing rate when a 1 mm diameter hole is used at 97 Hz frequency, zero phase optimized stroke and constant amplitude vibrations: a dotted line represents flowing rate when 2 mm diameter hole is used at 97 Hz frequency, zero phase optimized stroke and constant amplitude vibrations: a dashed line represents flowing rate when 3 mm diameter hole is used at 97 Hz frequency, zero phase optimized stroke and constant amplitude vibrations: a broken line represents a flowing rate when 3 mm diameter hole is used at 100 Hz frequency and amplitude & phase optimized vibrations; and a solid line represents a flowing rate when 35 mm long and 2 mm wide slot is used at 77 Hz frequency and amplitude & phase optimized vibrations.

DETAILED DESCRIPTION OF SPECIFIC EMBODIMENTS

Figure 1:
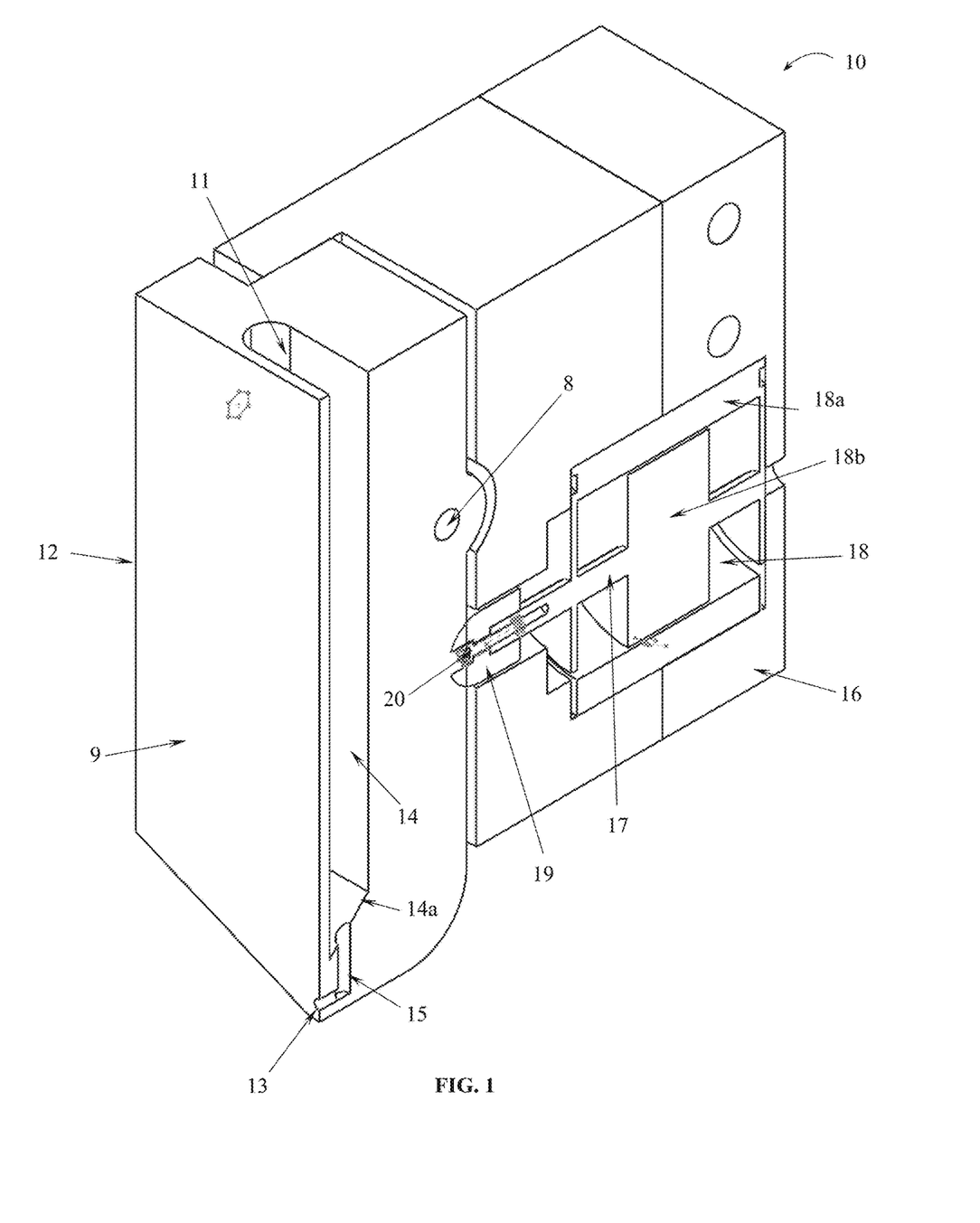
FIG. 1 is a perspective cross-sectional view of an example of an apparatus for dispensing powdered material showing a dispensing orifice.

FIG. 1 illustrates an apparatus for dispensing powdered material 10 having a dispenser 12 and a vibration system 16. The dispenser 12 has a housing 9 that defines an inner cavity 14 into which the powdered material is inserted. The inner cavity 14 has an inlet 11 and a dispensing opening 13. A bottom 14a of the inner cavity 14 can be slanted such that the powdered material is directed under gravity toward a passage/channel 15 that connects the inner cavity 14 and the dispensing opening 13. The passage 15 can have smaller cross-section so that it can direct the flow toward the dispensing opening 13. In some implementations, the passage 15 can have tapered configuration toward the dispensing opening 13. The powdered material from the inner cavity 14 flows through the passage 15 and out from the dispensing opening 13. In some implementations, the passage 15 can be omitted and the inner cavity 14 can have tapered configuration, forming a funnel, narrowing toward the dispensing opening 13. The passage 15 can be curved, however it can be straight without departing from the scope of the invention. The dispensing opening 13 can have various dimensions and shapes depending on the size and/or shape of the material's particles. The inner cavity 14 can also include a level sensor (not shown) which measures the level of the powdered material in the inner cavity 14 of the dispenser 12 and can trigger opening of a valve to refill the dispenser 12 when the material level in the cavity 14 is low, below a threshold. Thus, by using a level sensor, the apparatus 10 can be used in continuous manner to continuously dispense desired amounts of powdered material. The level sensor can be an optical, inductive or mechanical type of known sensors. The dispensing apparatus 10 can comprise at least one storage container 62 (see FIGS. 8, 9) that has at least one outlet in fluid communication with the inner cavity 14 of the dispenser 12. The storage container stores the powdered material so that the dispenser 12 can be refiled when required. The level sensor can for example send a signal to a controller 100 (FIG. 6) so that when the level of the material is under some pre-determined value the controller 100 can open the outlet of the storage container to refile the inner cavity 14 of the dispenser 12.

The vibration system 16 is adjacent to the dispenser 12 and can comprise a vibrator 17 and a driver 18 to drive the vibrator 17. For example, the vibrator 17 can have a movable head 20) and the driver 18 can drive the head 20 back-and-forward in linear fashion. A sleeve 19 with an inner guide can be anchored to the housing 9. The inner guide of the sleeve 19 is sized such that a head 20 can moves back-and-forward therein therefore providing tapping action to the housing 9 of the dispenser 12 therefore vibrating the dispenser 12. Such continuing vibrations of the dispenser 12 provide that the powdered material continuously flows out through the dispensing opening 13. The curved geometry of the passage 15, for some powdered materials, can allow the powdered material to flow only during vibrations while stop flowing without vibration due to the piling of the material on the curved section of the passage 15. The dispenser 12 can comprise a pivot 8 around which the dispenser 12 can turn or swing to dispense the material out of the dispensing opening 13 rotation.

Persons skilled in the art would understand that the sleeve 19 can be omitted and the moving head 20 can provide tapping motion to the dispenser 12 without being guided by the sleeve 19. The vibrator can be driven mechanically (e.g. a mechanical arm or a cam connected to the head and driven by a motor) or electromagnetically. For example, and as illustrated in the example shown in FIGS. 1-3, the driver 18 can comprise one or more coils 18a that are in electrical communication to a power source (not shown) to provide current pulses to the coils 18a and a permanent magnet 18b that drives the head 20 of the vibrator 17 back and forth in linear fashion depending on the direction of the current in the coils 18a. This is for illustration purposes only, and the head 20 can be driven in linear or rotational manner (e.g. by using a cam) as long as it provides a continuing periodic vibration to the dispenser 12. In case where the vibration systems comprise a vibrator that is driven in rotational manner, the frequency of the vibrations is defined as rounds-per-minute (RPM). Alternatively, for small (light) sizes of dispenser 12, the vibration system 16 can be an ultrasonic generator to generate ultrasound vibrations of the dispenser 12. The apparatus 10 can further comprise a controller 100 (FIG. 6) configured to control the driver 18 of the vibration system 16 to adjust the frequency, amplitude and/or the duration of the vibration of the dispenser 12.

Figure 2:
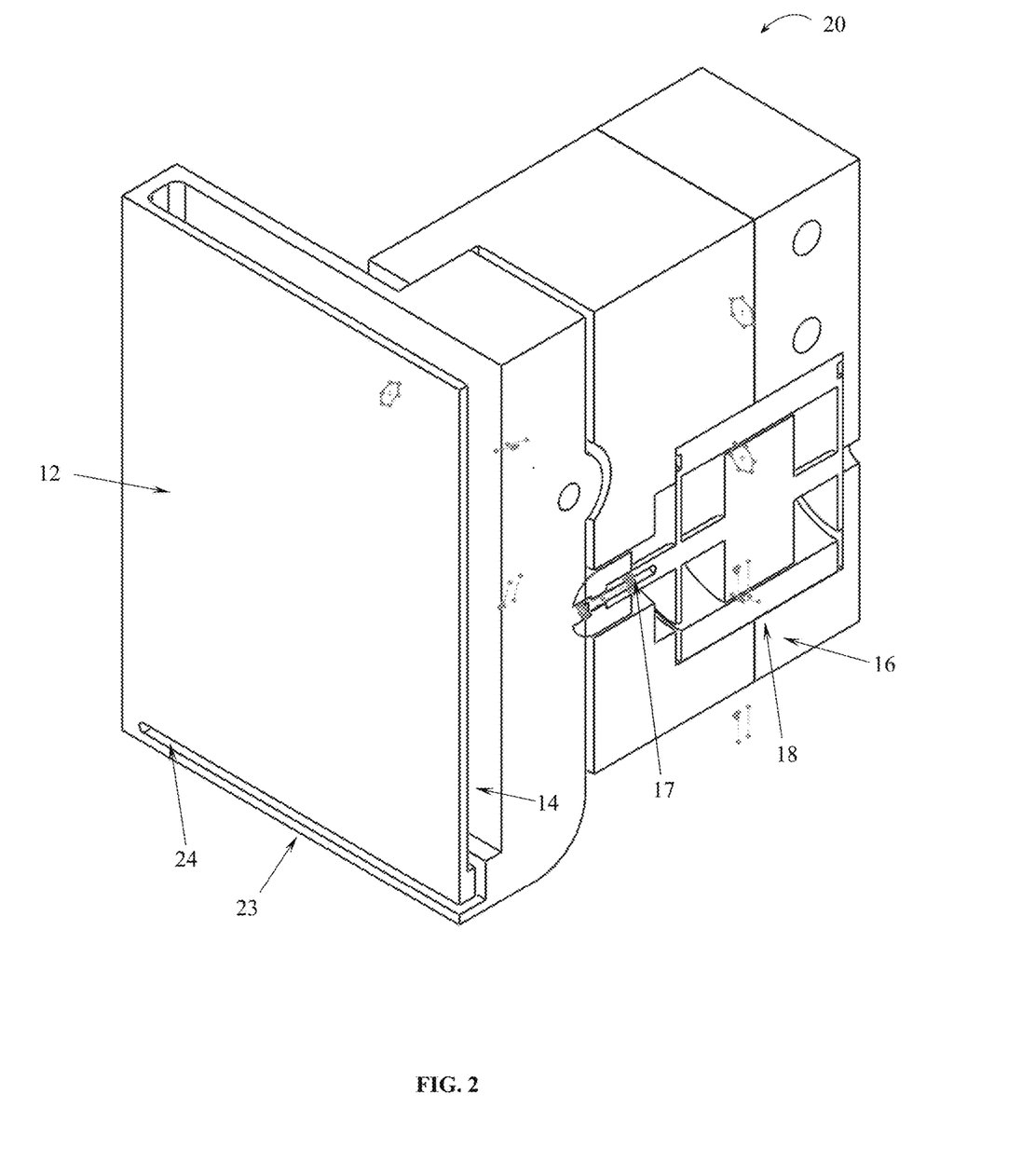
FIG. 2 is a perspective cross-sectional view of an example of an apparatus for dispensing powdered material showing a dispenser with a dispensing slot for dispensing a curtain of fluidized powder.

FIG. 2 illustrates another embodiment of an apparatus for dispensing the powdered material 20 where the dispensing opening is configured as a dispensing slot 23. The dispensing slot 23 can have an elongated L-shaped passage/channel 24 with closed ends and opened face. The channel 24 is in fluid communication with the inner cavity 14 of the dispenser 12, such that the powdered material is dispensed out through the slot 23 as a curtain 30 of fluidized powdered material (see FIG. 3), during vibration of the dispenser 12, as described herein above with respect to the apparatus 10 of FIG. 1. The opening of the slot 23 can have different sizes (narrower or wider) and different cross-sections depending on the size of the material's particles.

In some implementations, the dispensing slot 23 can comprise a vertical, straight channel 24*a* (see FIG. 3) instead of L-shaped channel 24 shown in FIG. 2. In some mode of operations, an edge 25 of the dispensing slot 23 can be used for leveling the powdered material 20 on a powder bed (not shown). For example, a point of rotation (pivoting) 8 of the dispenser slot 23 can be positioned as close as possible to the edge 25 of the slot 23. The dispensing slot 23 can also be closer to the pivot 8. At the beginning of the operation the edge of the nozzle of the dispensing slot 23 can be brought in contact with the powder bed, then the dispensing slot 23 can be lifted to a pre-determined distance from the powder bed, e.g. 50 μm away from the powder bed. As the vibrator 17 generates vibrations of the dispenser 12 it triggers flow of the powdered material on the powder bed while the edge is leveling the powdered layer preventing any layer inconsistence. In addition, the vibration of the dispenser 12 may cause tapping motion of the edge of the slot 23 to the powder bed further enhancing the continuous flow and compacting of the powdered material.

Figure 4:
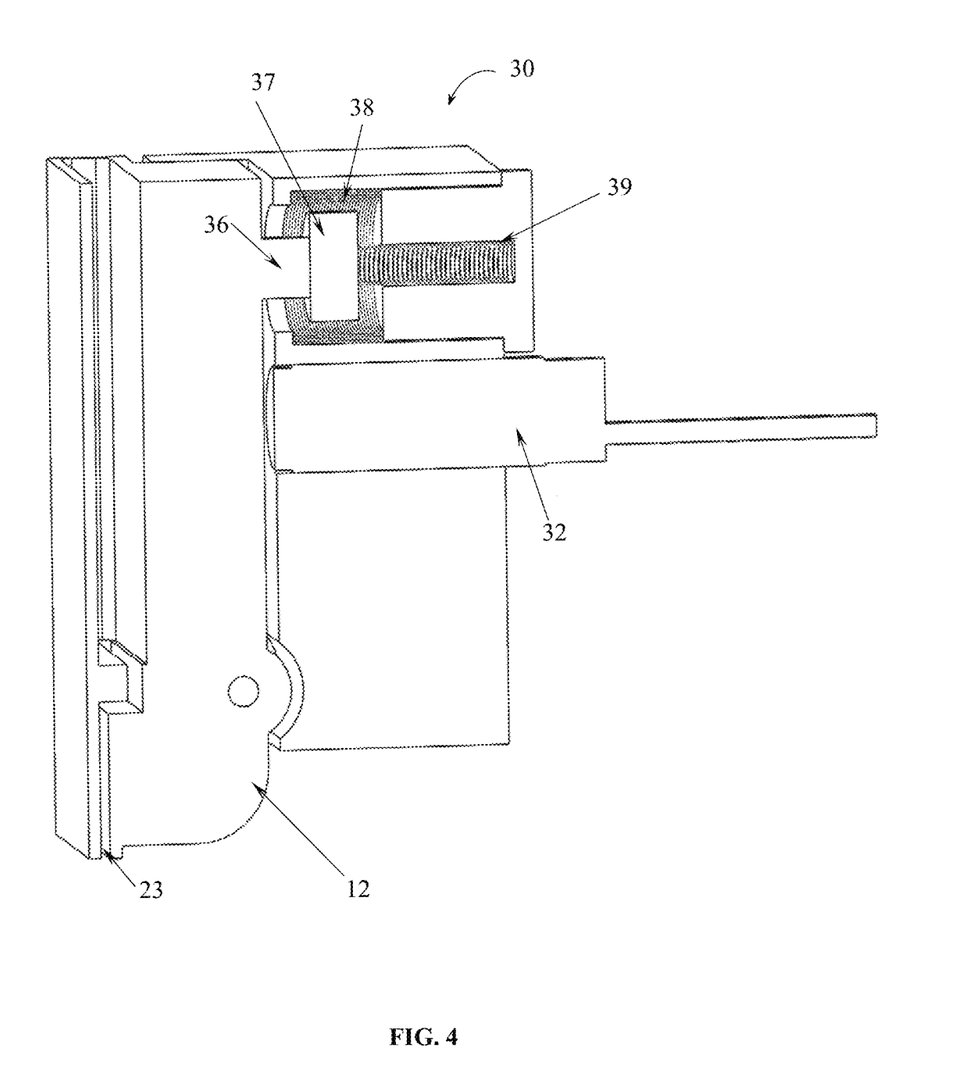
FIG. 4 is a perspective cross-sectional view of another example of the apparatus for dispensing powdered material with a direct drive of a dispenser.

FIG. 4 illustrates another embodiment of an apparatus for dispensing the powdered material 30 with a direct drive 36. The direct drive 36 comprises a permanent magnet 37 that is directly connected to the housing 9 of the dispenser 12 and a coil 38. The coil 38 is operatively coupled to a power source (not shown) so that when a current flow in the coil 38 it generates magnetic field. The magnetic field of the coil 38 reacts with the magnetic field of the permanent magnet 37, attracting or repelling depending on the direction of the current flow, thus directly vibrating (pushing/pulling) the dispenser 12 and the dispensing slot 23. A spring 39 can be added at the back of the permanent magnet 37 to stabilize the dispenser 12 when there is no current in the coil 38. In addition, a displacement sensor 32 positioned close to the dispenser 12 can be added to measure the mechanical movement (displacement) of the dispenser 12 during operation. The displacement sensor can send an input signal to the controller 100. Optionally, another displacement sensor (not shown) can be added in proximity to the storage container 62 to measure the mechanical vibration (displacement) of the storage container 62.

Figure 5:
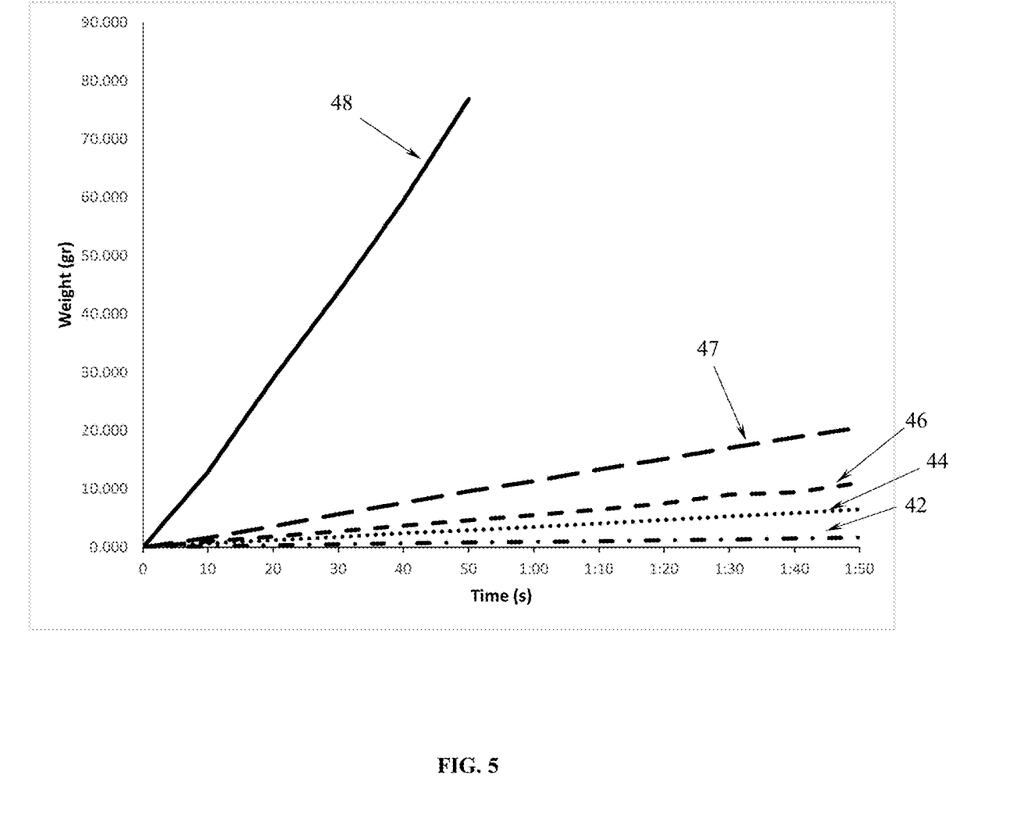

The apparatus for dispensing powdered materials 10, 20 has been tasted and the flow rates of the powdered material have been measured. For example, a titanium (Ti) metal powder has been put in the inner cavity 14 of the dispenser 12. Different sizes of dispensing opening 13/dispensing slot 23 have been used to test the flowability of the metal powder through different sizes of outlet. In addition, the experiments were conducted at different frequencies with constant or optimized amplitude. FIG. 5 graphically illustrates results from some of the experiments showing the flowing rate of the metal powder in grams per second. A dash-dot line 42 represents a flowing rate in grams per second when a 1 mm diameter hole was used, a dotted line 44 represents the flowing rate when 2 mm diameter hole was used and a dashed line 46 represents the flowing rate when 3 mm diameter hole was used. In all three cases the vibration system 16 was set up to provide vibrations of 97 Hz frequency and constant amplitude. As can be noticed from the graph, in all three cases represented by lines (42, 44, 46) a continuous flow of the metal powder has been obtained with flow rate increasing with the increase of the size of the opening 13/23, as expected. In order to evaluate the effect of the vibration frequency on the flow rate, further tests were conducted changing the frequency to 100 Hz (a broken line 47) and to 77 Hz (a solid line 48). In the first case (line 47), a 3 mm diameter hole was used, while in the second case (line 48) a 35 mm long, 2 mm wide slot was used. The amplitude and the phase of the vibrations were also adjusted and optimized through experimentation to provide higher flow rate. First, an optimal frequency for a given opening/slot configuration is established and then an amplitude at such frequency is optimized. The amplitude is defined as the tapping force/power. For example, if the power source provides more current to the coils 18*a*, the obtained tapping force on the dispenser 12 will be stronger, resulting in higher amplitude of the vibration to push the powder through the dispensing opening or slot 13/23. The optimization of the frequency (length of the stroke) and the amplitude (power of the stroke) for a given powdered material can be done through an experimental iteration. Comparing the line 47 with the line 46 it can be noticed that increasing the frequency of the vibration and optimizing the amplitude increases the flow rate to almost double for the same size of opening (3 mm diameter) and same powdered material. It can also be noticed that using a dispensing slot 23 instead of single opening 13 increases the flow rate, which is expected because of the bigger dispensing area.

The apparatus for dispensing the powdered material 10, 20, 30 can further comprise at least one storage container 62 (FIG. 8A) that is in fluid communication with the inner cavity 14 of the dispenser 12. When the apparatus in in an operational mode, the storage container 62 is configured to provide powdered material to the inner cavity 14 of the dispenser 12 in continuous manner at a pre-determined rate depending on the flow rate of the dispensing material out of the dispenser. In one implementation, a level sensor can be provided in the inner cavity 14 of the dispenser so that when the powdered material in the cavity 14 is below the pre-determined level the sensor opens a valve/outlet between the storage container 62 and the dispenser 12 to provide additional quantity of powdered material into the dispenser 12.

Figure 6:
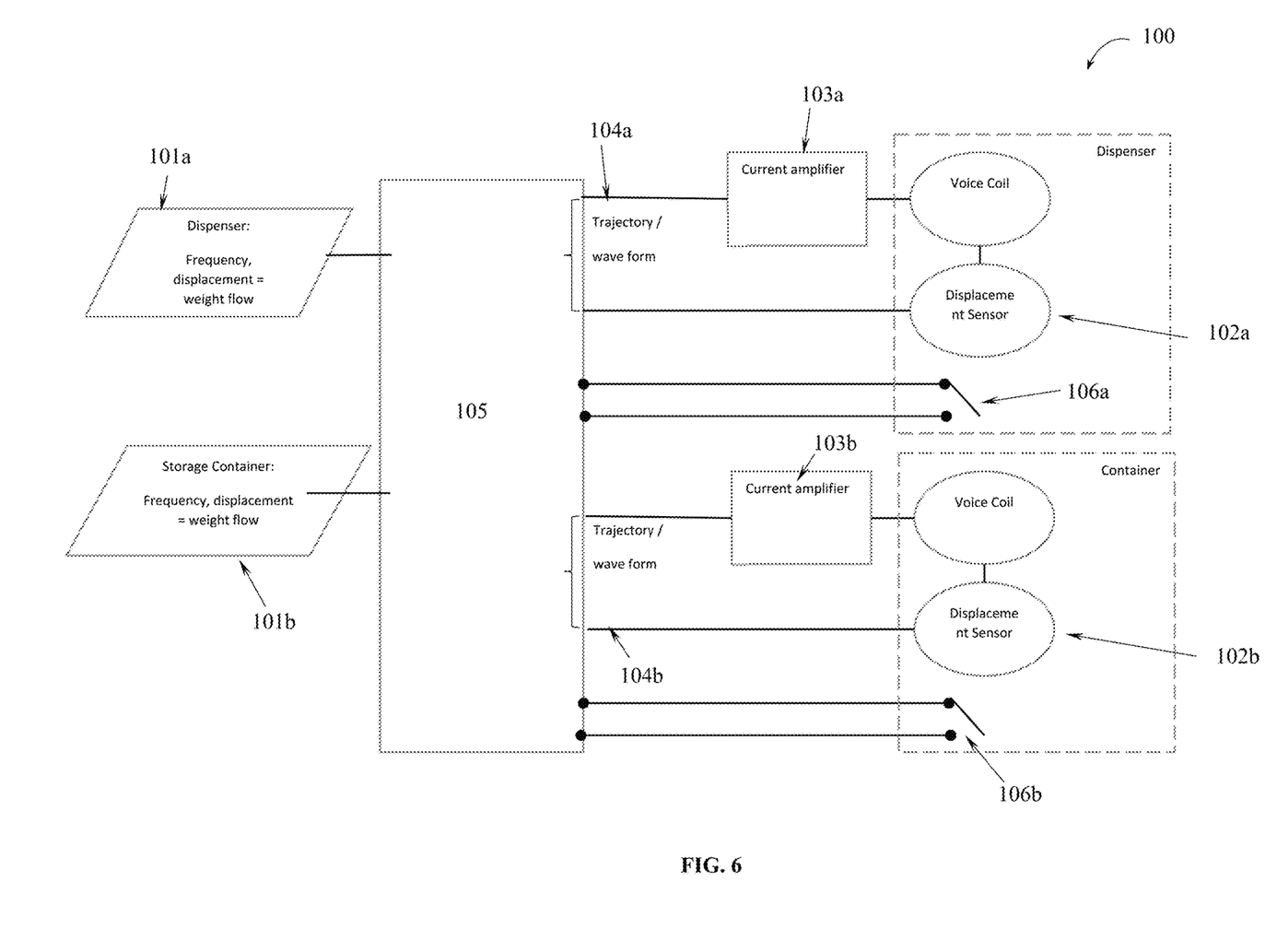
FIG. 6 is a flow chart of an example of a control system of an embodiment of an apparatus for dispensing powdered material.

In operation, the powdered material is put in the dispenser 12 and then the controller 100 (FIG. 6) sets up the frequency and amplitude of the vibrations to be applied to the dispenser 12. When the vibration system 16, 36 is triggered, the dispenser 12 starts to vibrate, providing a continuous flow of powdered material out of the dispenser 12. FIG. 6 illustrates one example of the control system 100 of the dispensing system 10, 20, 30. The controller 100 is in communication with the dispenser 12 so that it can adjust dispenser's oscillation e.g., frequency and amplitude of dispenser's vibration. The controller 100 can also be in communication with the storage container 62. The controller receives as input a flow rate (weight flow) of the powdered material 101*a* out of the dispenser 12 and a flow rate of the powdered material 101*b* out of the storage container. The controller 100 is in communication with the dispenser's displacement sensor 102*a* and the level sensor 106*a* about the respective mechanical movement of the dispenser 12 and the amount of powdered material in the dispenser 12. In some implementations, a displacement sensor 102*b* and a level sensor 106*b* can be provided to measure the displacement of the storage container 62 and the amount of powder material therein. The mechanical displacement of the dispenser 12 and/or the tank 62 can vary during the operation, due to for example, the change of the amount of powder in the container 62 and/or the inner cavity 14 of the dispenser 12. Therefore, the controller 100 can also be in communication with the storage container's displacement sensor 102*b* and the level sensor 106*b* to receive signals about the respective mechanical movement and the amount of powdered material in the storage container 62. A processing unit 105 of the controller 100 receives instructions (input parameters) of the powdered material and the desired flow rate (weight rate) of the powdered material that needs to be dispensed in the powder bed. Various input parameters can be set directly or through a digital interface. Depending on the size of the dispensing opening 13, 23 and the powder material density, the frequency is adjusted in relation to the powder size (e.g., in a range of 10 to 600 Hz). Typically, a larger powder (0.1 to 0.25 mm) requires lower frequencies and a finer powder (0.02 to 0.05 mm) requires higher frequencies. The vibration, such as the frequency and the amplitude of the displacement of the dispenser 12 is set in relation to a target flow rate, the size of the dispensing opening 13, 23 and the powder size. The processing unit 105 receives a signal from the displacement sensor 102a that measures the displacement of the dispenser 12 and compares such data to the target displacement (desired flow rate) and adjusts such displacement by adjusting the current 103 in the driver (e.g. coil 18a, 38). Thus, the controller 100 can control/adjust the trajectory (wave form) of the dispenser 12 in real-time based on the signals received from the displacement sensor 102a. The controller 100 also receives signals from the level sensor 106a and 106b to control the amount of the powdered material in the dispenser 12 and the storage container 62. For example, if the fill level in the dispenser 12 (or in some implementations the fill level in the storage container 62) is below a certain threshold, the controller 100 will send a signal (trigger) to refill the dispenser 12 and/or the storage container 62. For example, a valve/outlet between the dispenser 12 and the container 62 will open and close based on the trigger signal from the controller 100. Once the dispensing flow rate is set, the processing unit 105 can set (calculates) the required dispensing displacement (distance) and frequency of the dispenser 12 and will adjust the current in the driver coil to control in real-time the actual displacement (vibration) of the dispenser 12. Displacement distance of the dispenser 12 can vary from 0.1 to 8 mm and in case of large feed (flow) rates the displacement can be for example 10s of mm.

In one implementation, the controller 100 can receive the input parameters, such as the size of the dispensing opening, the material (size of the powder) and flow (weight) rate, and can set the frequency and displacement of the dispenser 12 by calculating optimal settings. The start-stop of the feeding can be controlled by external time-triggers or the operation time schedule can be part of the controller.

The apparatus for the dispensing powdered materials 10, 20, 30 can be used in different industries, such as for example, in the pharma industry for dispensing a small amount of medicament in controlled and accurate fashion, in the food or chemical industry for delivering accurate amounts of ingredients/reactants, in the additive manufacturing industry for providing (and spreading in same cases) the powdered material on the powder bed or in the welding industry (e.g. plasma ark welding).

Figure 7:
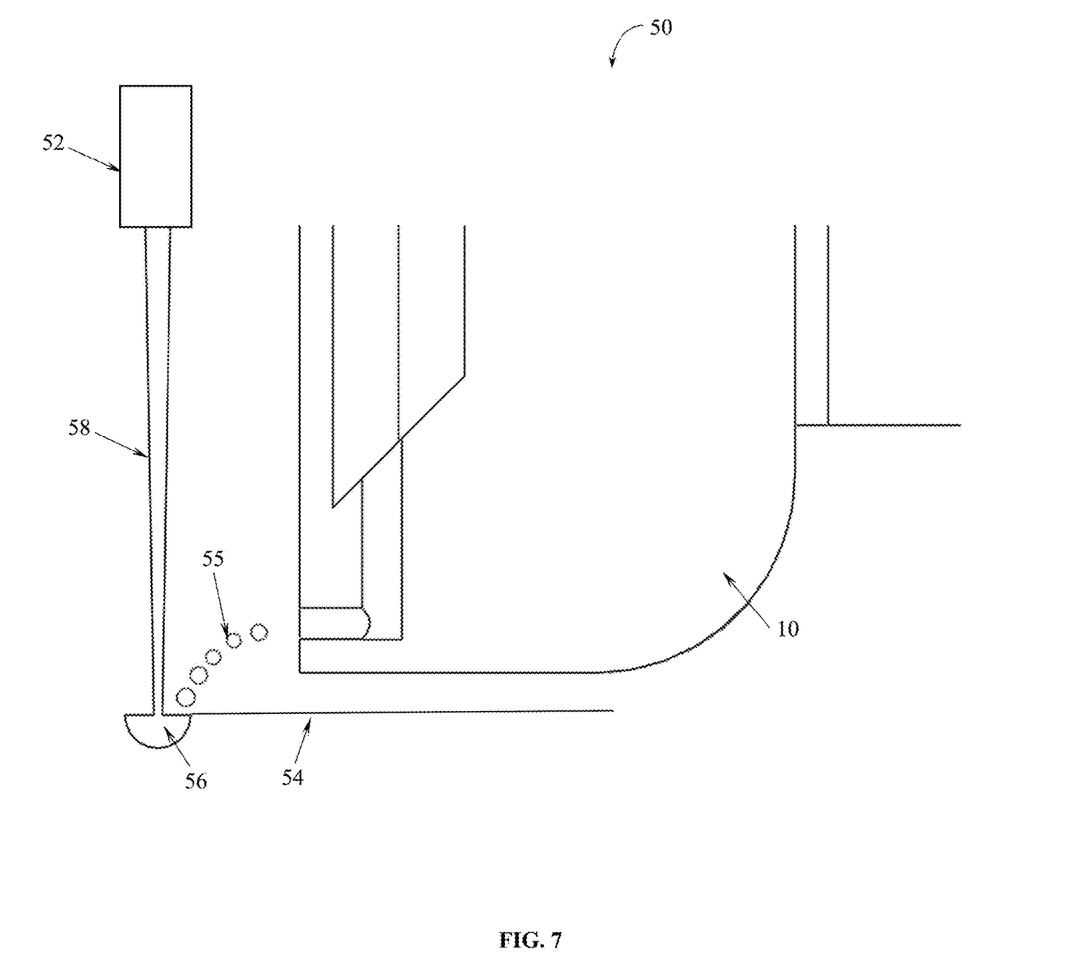
FIG. 7 is a side cross-sectional and partial view of an example of an additive manufacturing system employing an example of the apparatus for dispensing powdered material of the present invention.

FIG. 7 illustrates one example of an additive manufacturing system 50 that employs the dispensing apparatus 10, 20, 30. The system 50 can be an electron-beam melting system (EBM) or a selective laser melting system (SLM) and can comprise an energy source 52, such as for example, an electron-beam gun 52 or a laser, and a working chamber (not shown) coupled to the energy source 52. In case when the system 50 is an EBM system, the working chamber is a vacuum chamber. A work platform (not shown) is positioned in the chamber and a powder bed 54 is positioned on the work platform. The work platform can be moved in Z-direction up and down to provide layer-by-layer structure of the product. The apparatus for dispensing the powdered material 10 is also positioned within the chamber to dispense a controllable amount of powdered material 55 onto the powdered bed 54. The energy source 52 can generate an energy beam 58 that is focused, using a focusing means (not shown), onto the powder dispensed onto the powder bed 54, melting such powdered material and producing small volume of melt pool 56. The dispensing apparatus 10, 20, 30 can be mounted on a moving platform (not shown) and can be at some pre-determined distance above the power bed 54. The moving platform can move the dispensing apparatus 10 in X and/or Y directions, so that a layer of the powdered material can be laid on the powder bed 54 without using a spreader, such as a rake or a comb that is usually used in the known additive manufacturing systems. In some implementation, the dispensing apparatus 10, 20, 30 can be stationary and the work platform can move the powder bed 54 in X and/or Y directions such that the layer of the powdered material is laid on the power bed 54. The energy beam 58 can be focused using a focus lens and/or coils to converge the beam radially to form a focal spot. The energy beam 58 can further be deflected (using a deflection lens and/or coils) to change the direction or path of the beam 58 to a different focal spot to melt the powder deposited at such different focal spot forming another melt pool. The melting pools are then rapidly solidified forming a layer of a product. Then this process is repeated to add additional powder layers and get a layer-by-layer fabrication of the work product. In one implementation, the dispensing apparatus and the energy source 52 can be synchronized, such that as the dispensing apparatus dispense the powder on the powder bed 54, it is simultaneously melted by the energy beam 58. This means that the controller (e.g., controller 100) controls the triggering time of the dispensing apparatus and the energy source 52 such that the pulse of the energy beam and the dispensing time (vibration pulse) are synchronized. The vibration and the beam pulses can be for example at the rate of 50-100 Hz.

The powdered material used in the additive manufacturing system 50 needs to be conductive to avoid being displaced by electrostatic charging when the electron beam is focused onto the powder. In order to increase the conductivity of the metal powder the powder bed 54 is preheated at predetermined temperatures (e.g., between 400°-800° C. depending on the material). In one embodiment, illustrated in FIG. 8A, the powdered material is preheated before entering the dispenser 12. For example, the powdered material exiting the storage container 62 can enter an elongated heater 72, such as for example electrically heated tube 72. The heater 72 can be inclined so that the powdered material can flow in the tube under gravity or the material flow, down the heater 72, can be facilitated by vibrating the heater 72 at predetermined frequency. The outlet of the heater 72 is in fluid communication with the inner cavity of the dispenser 12. The powdered material preheated in the heater 72, to a predetermined temperature, enters the dispenser 12 and through the dispensing opening is positioned on the powder bed 54. In some implementations, the heater can be positioned in the dispenser, e.g., around the inner cavity 14 or in proximity to the dispensing opening to pre-heat the dispensed powdered material.

Figure 8A:
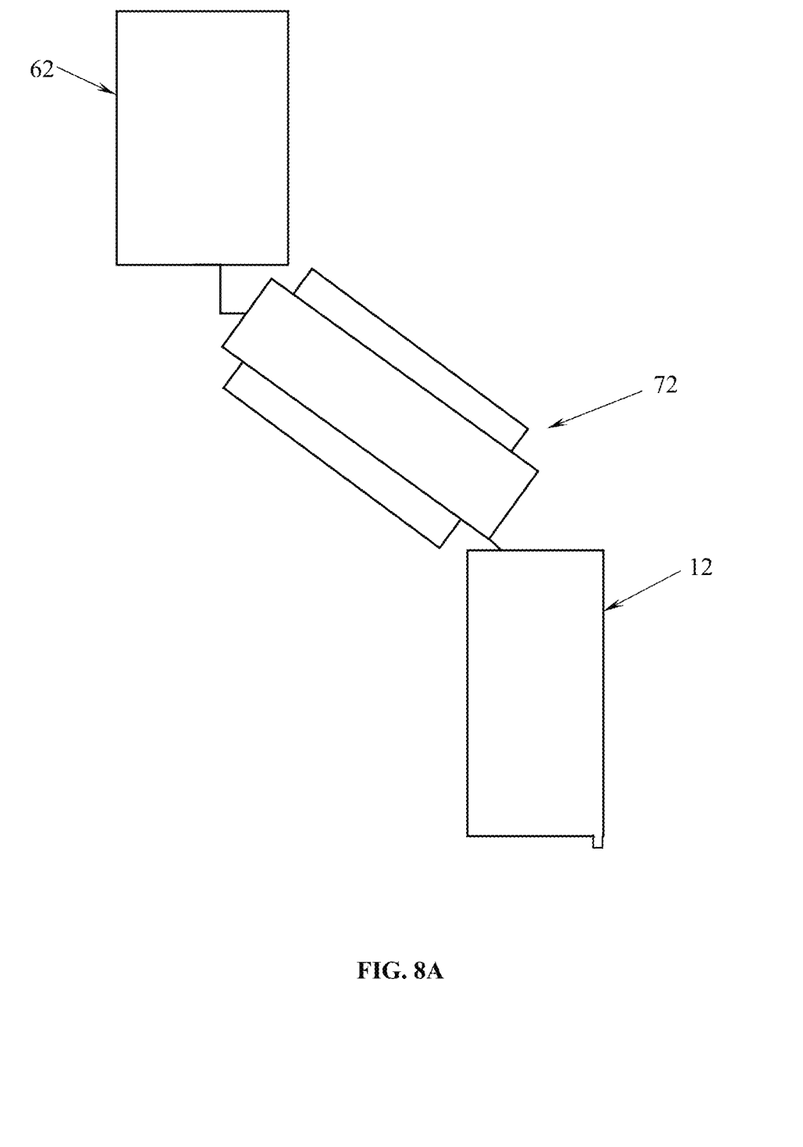
FIG. 8A is a sketch of an example of an apparatus for dispensing powdered material used in an additive manufacturing system having a heater positioned between a storing container and a dispenser to preheat the powdered material.
Figure 8B:
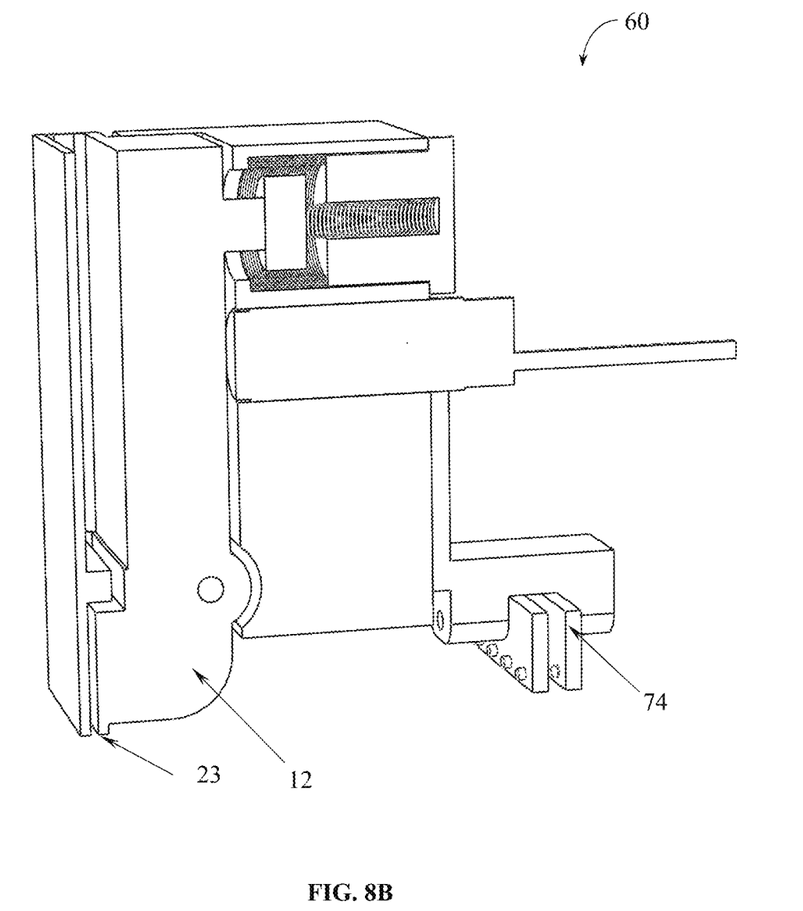
FIG. 8B is a perspective view of an example of an apparatus for dispensing powdered material used in an additive manufacturing system with a pulse generator.

FIG. 8B illustrate another embodiment of the dispensing apparatus 60 that uses a pulse generator 74 to increase the electric conductivity of the powdered material. The pulsed generator 74 is positioned adjacent to the dispenser 12 at some vertical distance above the dispensing slot 23. The powder conductivity can be improved using the Branly effect. Namely, a high voltage power supply and a waveform generator is used to cause the potential differential charge between the pulse generator terminals to create electromagnetic pulses of electrical discharges (e.g., arcs) which improves the electric conductivity of the powder when the electromagnetic field travel through the exposed powder.

Figure 9:
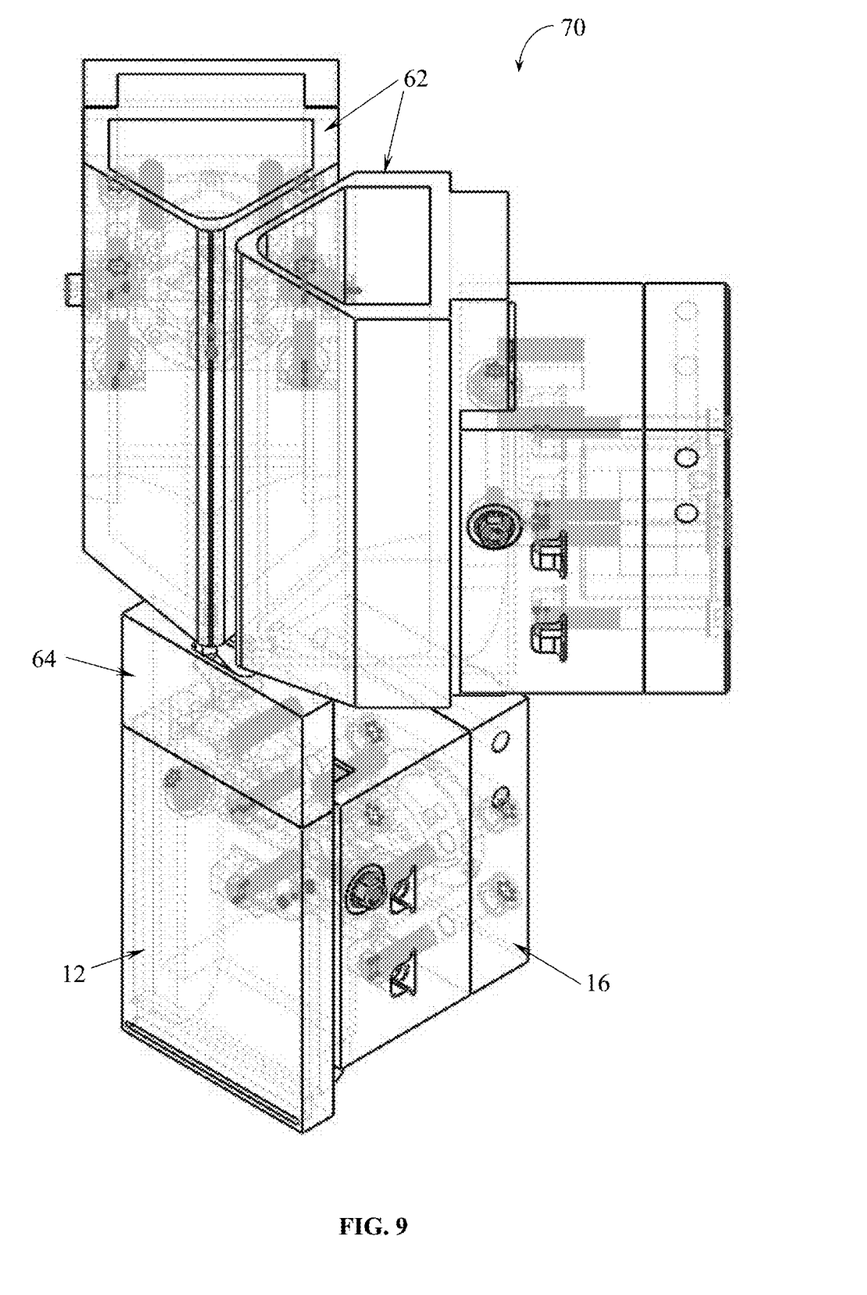
FIG. 9 is a perspective view of an example of an apparatus for dispensing mixed powdered materials showing two materials storing containers, a mixing chamber and a dispenser.
Figure 10:
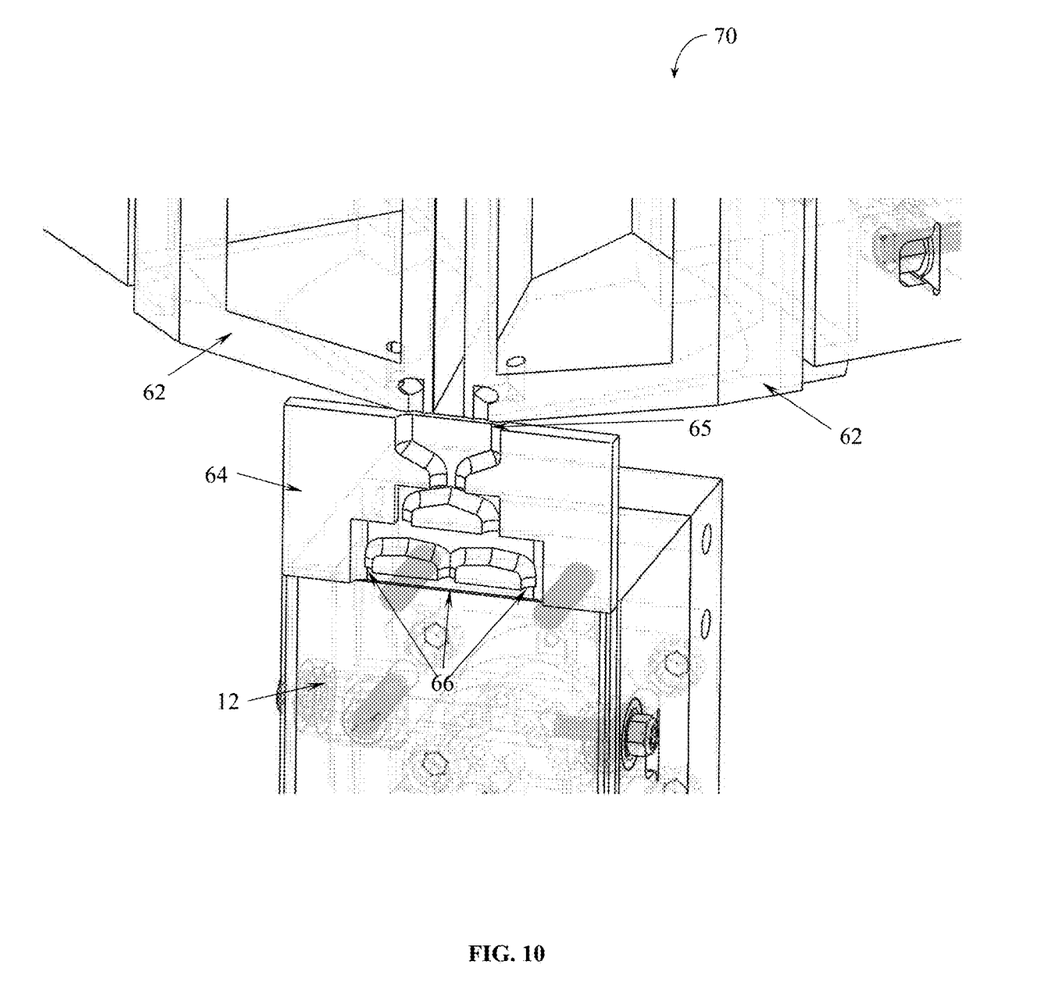
FIG. 10 is a perspective cross-sectional view of the apparatus of FIG. 9 showing in details the mixing chamber.

FIGS. 9 and 10 illustrate another embodiment of a dispensing apparatus 70 for dispensing a mixture of two (or more) powdered materials (e.g. an alloy). The dispensing apparatus 70 can comprise the dispenser 12 and the vibration system 16/36 same as the one described herein above with respect to the FIGS. 1-4. The dispensing apparatus 70 can further comprise at least two storage containers 62. In the illustrated example, the dispensing apparatus 70 comprises two storage containers 62, each containing different powdered material, however there can be more or less than two storage containers depending whether the material to be dispensed is a mixture or two or more substances or a single substance. A mixing chamber 64 is provided between the storage containers 62 and the dispenser 12. The mixing chamber 64 has at least two inlets 65 (see FIG. 10), each inlet 65 being in fluid communication with an outlet of a respective storage container 62. The mixing chamber 64 is connected to the dispenser 12 and comprises one or more outlets 66 that are in fluid communication with the inner cavity of the dispenser 12 to deliver the mixed powder into the dispenser 12. As the dispenser 12 vibrates, the mixing chamber 64 vibrates too therefore mixing the particles of the two (or in some cases more than two) powdered materials. In some implementations, the mixing chamber 64 can have two or more intersecting channels 67 to direct the powders to multiple intersecting sections 68 where the powders mix. The channels 67 can be curved to allow the powders to flow only during vibrations however, persons skilled in the art would understand that the intersecting channels can be straight or curved without departing from the scope of the invention. In one implementation, a heater (not shown) can be added to preheat the powder in the mixing chamber 64.

Figure 3:
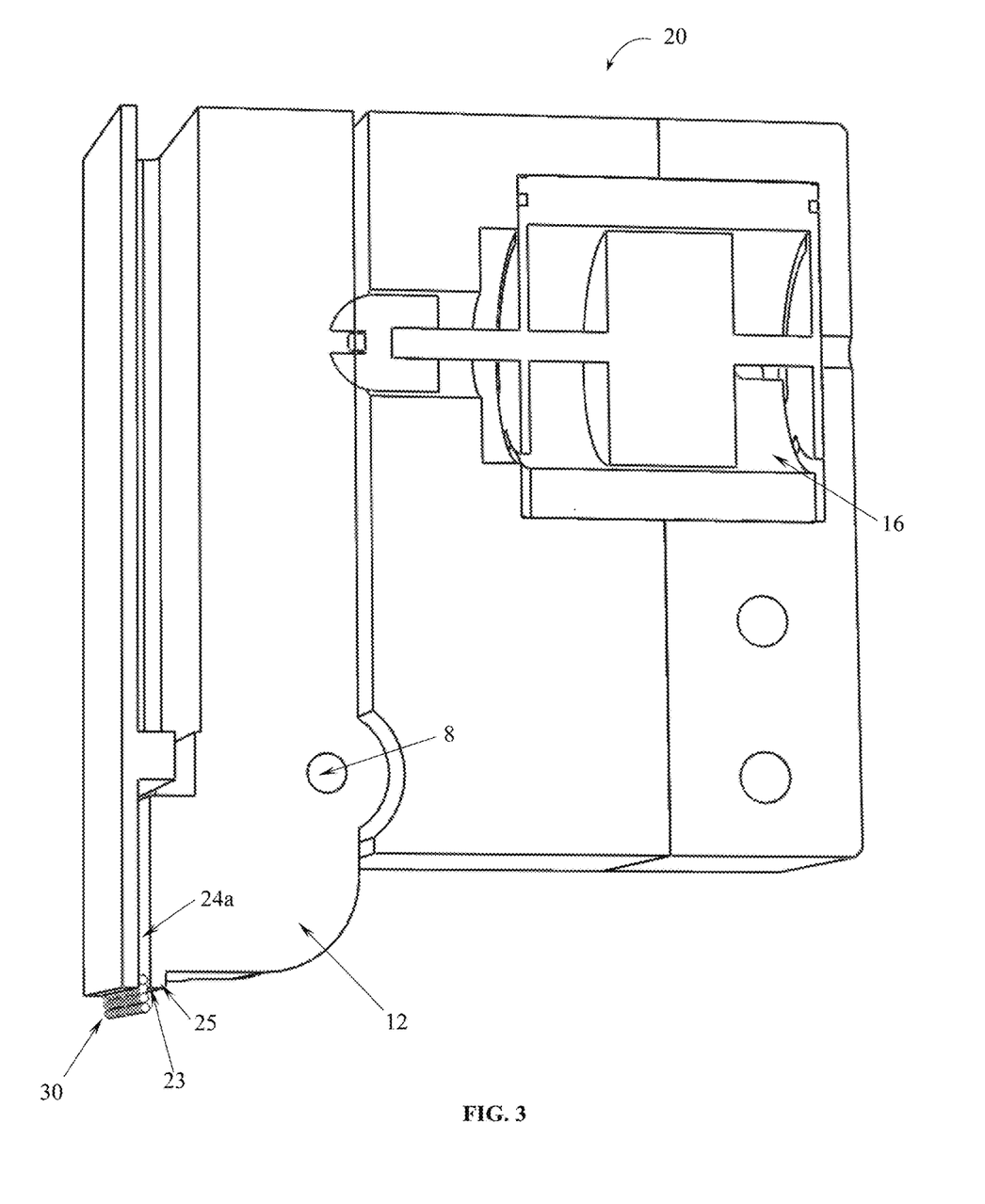
FIG. 3 is a perspective cross-sectional view of an example of the apparatus for dispensing powdered material of FIG. 2 showing a curtain of a fluidized powder flowing out of the dispensing slot.
Figure 11:
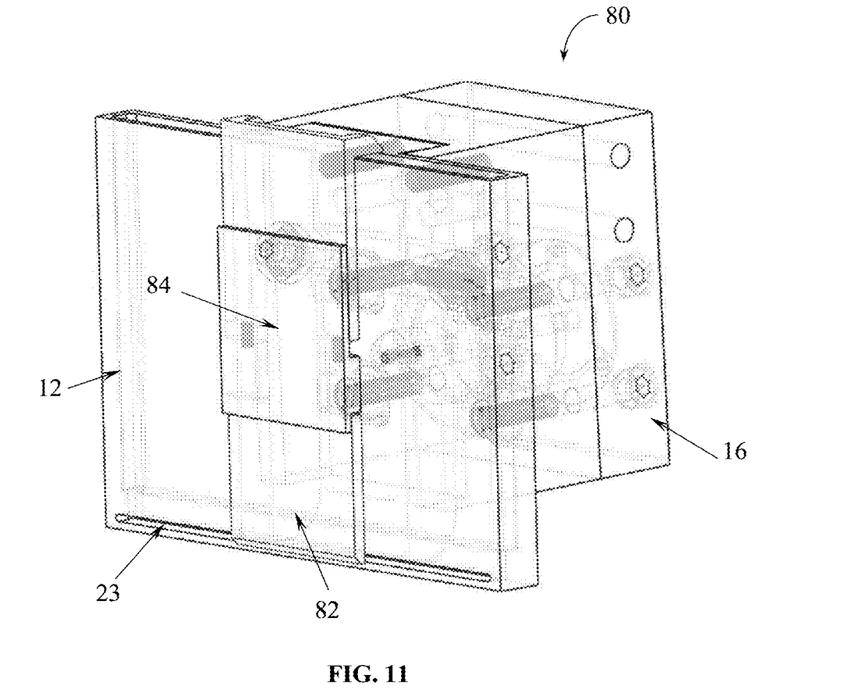
FIG. 11 is a perspective view of an example of an apparatus for dispensing powdered material with a dispensing slot and a shutter for providing an intermitted curtain of fluidized powder when the shutter is in closed position.
Figure 12:
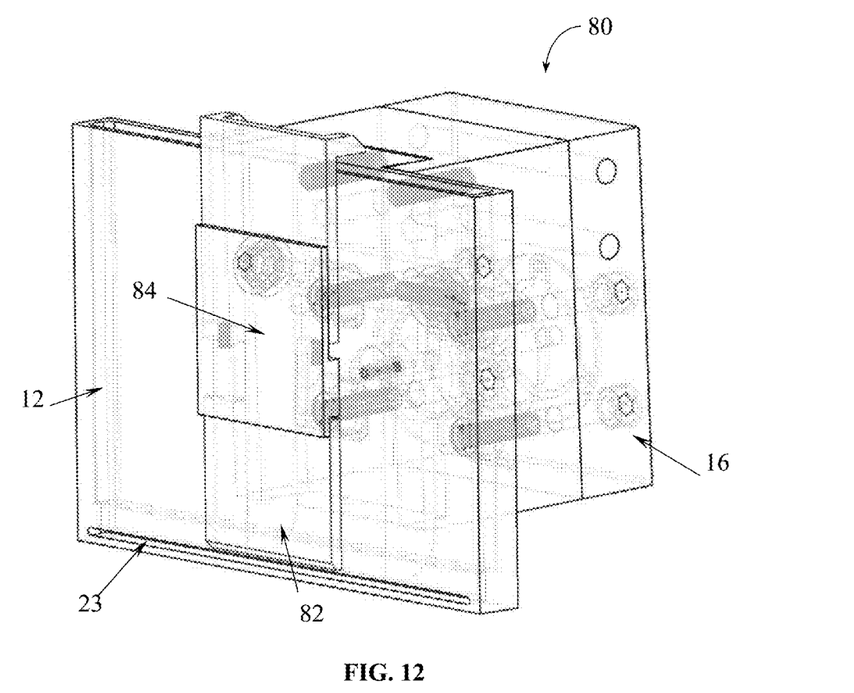
FIG. 12 is a perspective view of the apparatus of FIG. 11 with the shutter in an opened position for providing a continuous curtain of fluidized powder.

FIGS. 11 and 12 illustrate an example of another embodiment of a dispensing apparatus 80. The dispensing apparatus 80 is similar to the apparatus 20 of FIG. 2 with the dispensing slot 23 to provide a curtain of fluidized powdered layer 30 (FIG. 3). The dispenser 12 further comprises a shutter 82 that is configured to slide a predetermined distance in a vertical Z-direction, such that when the shutter 82 is in a first position (see FIG. 11), it is blocking a portion of the slot 23, such that the curtain of the fluidized powder layer is interrupted. When the shutter is in a second position (see FIG. 12), the slot 23 is not blocked and a continuous curtain of powder layer is provided. The shutter 82 is connected to a driver 84 that is configured to drive the shutter up and down between the first and the second positions. The driver can be controlled by a controller (e.g. the controller 100) that can be pre-programmed to timely adjust the position of the shutter 82. The driver 84 can be an electromagnetic or a mechanical without departing from the scope of the invention.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment." or the like, throughout this disclosure are not necessarily all referring to the same embodiment and may refer to one or more of the same or different embodiments. Indeed, the novel methods and systems described herein may be embodied in a variety of other forms: furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. An apparatus for dispensing a powdered material comprising:
    a dispenser having a housing defining an inner cavity with an inlet and a dispensing opening; and
    a vibrating system having a driver, the vibrating system being in communication to the dispenser to provide a continuing periodic oscillation of the dispenser, a controller in communication with the driver of the vibrating system to control a frequency and an amplitude of the oscillation of the dispenser;

a level sensor coupled to the dispenser and configured to measure an amount of powdered material in the dispenser and providing an input signal to the controller;

a displacement sensor coupled to the dispenser and configured to measure mechanical displacement rate of the dispenser and provides an input signal to the controller about the measured displacement rate of the dispenser, the controller compares the measured displacement rate with a predetermined target displacement rate and adjusts the frequency and/or the amplitude of the vibrations based on the input signal from the displacement sensor and the input signal from the level sensor such that the measured displacement rate matches the target displacement rate, wherein the powdered material continuously flows out through the dispensing opening during vibration of the dispenser.

2. The apparatus of claim 1, further comprising at least one storage container to store the powdered material, the inlet of the dispenser being in fluid communication with the at least one storage container.

3. The apparatus of claim 2, wherein the controller sends a second signal to a valve between the storage container and the inner cavity of the dispenser to open the valve and fill-up the dispenser to a pre-determined level.

4. The apparatus of claim 2 further comprising at least two storage containers for storing different powdered materials and a mixing chamber positioned between the storage containers and the dispenser, the mixing chamber comprising at least two inlets and an outlet, one of the at least two inlets being in fluid communication with one storage container and the other inlet being in fluid communication with another storage container, the mixing chamber being configured to mix the different powdered materials and feed the mixture of the different powdered materials to the dispenser through the mixer's outlet.

5. The apparatus of claim 2, further comprising an additional displacement sensor coupled to the at least one storage container to measure a displacement rate of the at least one storage container and provide a measured displacement rate signal as an input signal to the controller to adjust the frequency and/or the amplitude of the vibrations based on such input signal.

6. The apparatus of claim 1, wherein the controller adjusts a frequency and/or an amplitude of the vibrations in real-time based on the input signal from the displacement sensor.

7. The apparatus of claim 1, wherein the dispensing opening is a dispensing slot with an elongated channel to dispense a curtain of a fluidized powdered material during vibration of the dispenser.

8. The apparatus of claim 7 further comprising a movable shutter and a driver to drive the shutter, when the shutter is in a first position it closes a portion of the dispensing slot to provide an interrupted fluidized powder layer, and when the shutter is in a second position, the dispensing slot is uncovered.

9. The apparatus of claim 1, wherein the vibrating system further comprises a vibrator having a moving head that is driven back and forward in linear fashion providing tapping action to the housing of the dispenser.

10. The apparatus of claim 9, wherein the driver is an electromagnetic driver comprising a permanent magnet connected to the vibrator and a coil operatively coupled to a power source to energize the coil.

11. The apparatus of claim 1, wherein the driver of the vibrating system directly drives the dispenser, the driver comprising a permanent magnet connected to the housing of the dispenser and a coil operatively coupled to a power source.

12. The apparatus of claim 1, further comprising a leveling edge formed at an edge of the dispensing opening to level a dispensed powdered material onto a powder bed where such powdered material is dispensed.

13. The apparatus of claim 1, further comprising a curved channel or an elongated L-shaped channel formed between the inner cavity and the dispensing opening.

14. An additive manufacturing system comprising:
an energy source;
a working chamber coupled to the energy source;
a work platform positioned in the working chamber;
a powder bed positioned on the work platform; and
the apparatus of claim 1 for dispensing the powdered material onto the powder bed,
wherein the energy source generates an energy beam that is focused using a focusing means onto a small region of the powder bed where the powdered material is positioned producing small volumes of melt pools.

15. The additive manufacturing system of claim 14, wherein the energy source is an electron-beam gun and the working chamber is a vacuum chamber.

16. The additive manufacturing system of claim 14, further comprises a pulse generator positioned adjacent to the dispenser at some vertical distance above the dispensing opening, the pulse generator having a high voltage power supply and a waveform generator to cause potential differential charge between pulse generator terminals and create electromagnetic pulses of electrical discharges, the electric conductivity of the powdered material increases when a generated electromagnetic field travels through an exposed powdered material.

17. The additive manufacturing system of claim 14, further comprises a heater configured to increase a temperature of the powdered material dispensed onto the powder bed.

18. The additive manufacturing system of claim 17, wherein the heater is adjacent to the inlet of the dispenser.

19. The additive manufacturing system of claim 17, wherein the heater increases the temperature of the powdered material to 400-800° C.

20. The additive manufacturing system of claim 14, wherein the energy source is a laser.

* * * * *